United States Patent
Nagayama et al.

(10) Patent No.: US 7,025,185 B2
(45) Date of Patent: Apr. 11, 2006

(54) TORQUE RELEASING DEVICE

(75) Inventors: Akihide Nagayama, Kashiba (JP); Youichi Numada, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/746,417

(22) Filed: Dec. 23, 2003

(65) Prior Publication Data
US 2004/0134738 A1  Jul. 15, 2004

(30) Foreign Application Priority Data
Dec. 27, 2002 (JP) .............................. 2002-381822

(51) Int. Cl.
*F16D 1/06* (2006.01)

(52) U.S. Cl. .......................... 192/56.3; 192/79; 403/5; 464/30

(58) Field of Classification Search ................ 192/71, 192/79, 55.1, 56.1, 56.3; 403/5; 464/24, 464/30, 26, 32
See application file for complete search history.

(56) References Cited

U.S. PATENT DOCUMENTS

| 4,459,121 | A | | 7/1984 | Gazzera et al. | |
|---|---|---|---|---|---|
| 4,752,275 | A | * | 6/1988 | Lindenthal et al. | ........... 464/32 |
| 4,944,377 | A | * | 7/1990 | Elsner | ........ 192/56.3 |
| 5,051,018 | A | * | 9/1991 | Appell et al. | ......... 403/5 |
| 5,407,046 | A | * | 4/1995 | Kawasaki | ......... 192/56.3 |
| 6,761,256 | B1 | * | 7/2004 | Falk | ........ 192/56.3 |

FOREIGN PATENT DOCUMENTS

GB  2 268 569 A  1/1994
JP  05-087149  4/1993

OTHER PUBLICATIONS

"Rolling Bearing Types and Dimension Tables," pp. 6–7, XP-002329342.

* cited by examiner

*Primary Examiner*—Saul Rodriguez
(74) *Attorney, Agent, or Firm*—Smith, Gambrell & Russell, LLP

(57) ABSTRACT

In a torque releasing device, a bearing is composed of an angular contact ball bearing, raceway surfaces of which are applied with a pre-load in order that the occurrence of fretting at the bearing during torque transmission may be prevented. Thus is ensured that the torque is securely released.

20 Claims, 1 Drawing Sheet

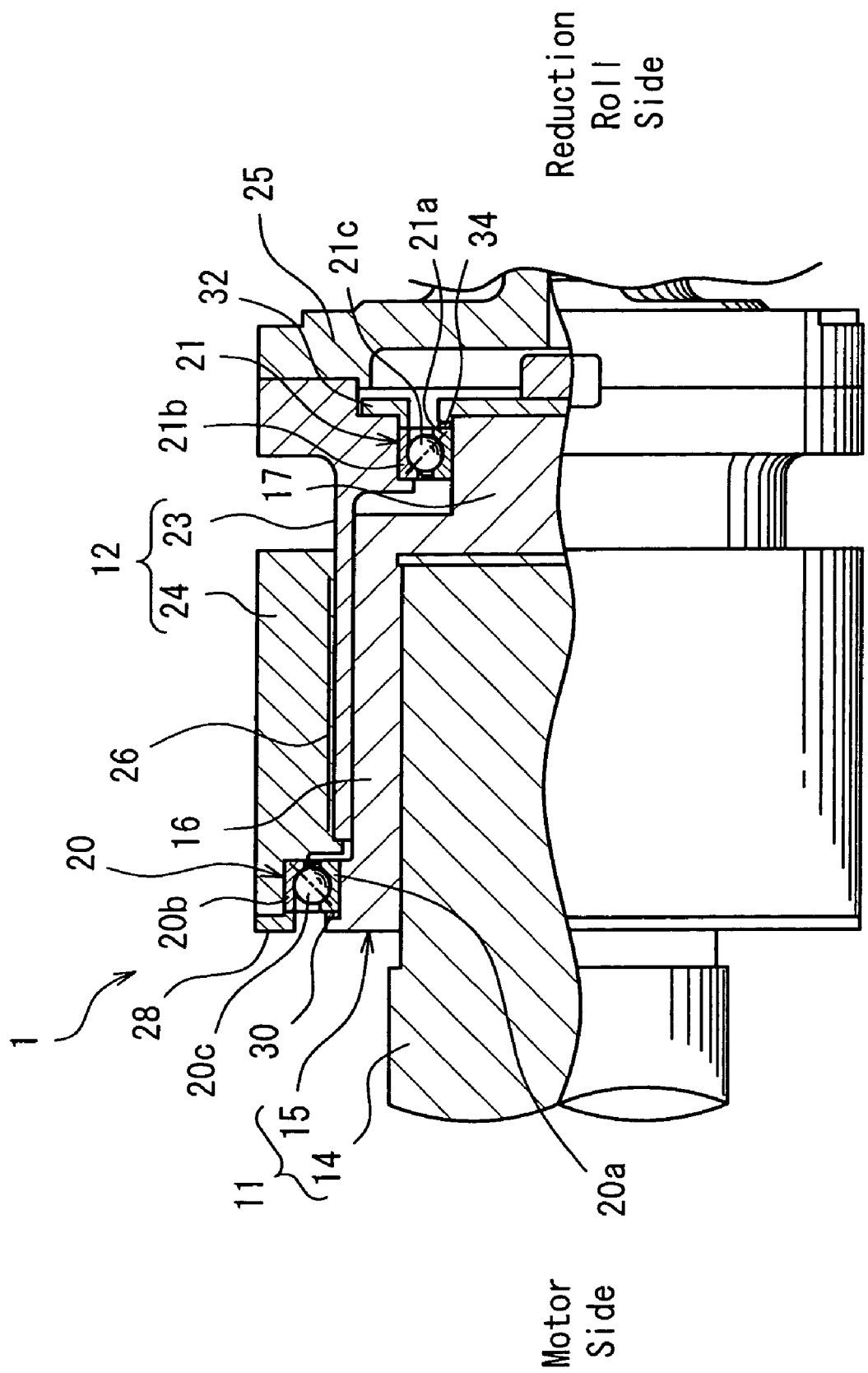

TORQUE RELEASING DEVICE

FIELD OF THE INVENTION

The present invention relates to a torque releasing device.

DESCRIPTION OF THE PRIOR ART

As a conventional torque releasing device, there is known one disclosed in Japanese Unexamined Patent Publication No.5-87149. The torque releasing device includes a shaft member; and a cylinder member having a hydraulic oil path operative to press an inner circumferential face thereof against an outer circumferential face of the shaft member. Normally, the cylinder member is engaged with the shaft member by means of pressure oil supplied to the hydraulic oil path, so that torque may be transmitted between the shaft member and the cylinder member.

Torque releasing takes place when the shaft member or the cylinder member is subjected to load in excess of a predetermined value. When the load above the predetermined value causes the cylinder member to slip at its inner circumferential face, the pressure oil in the hydraulic oil path is discharged outside so as to release the cylinder member from the engagement with the shaft member. Thus, cylinder member idles while the torque transmission is disabled.

The Japanese Unexamined Patent Publication No.5-87149 also discloses a bearing interposed between the shaft member and the cylinder member. The bearing provides for smooth relative rotation between the shaft member and the cylinder member when the shaft member and the cylinder member are released from the coupling therebetween.

According to the Japanese Unexamined Patent Publication No.5-87149, the bearing is illustrated as a deep-groove ball bearing in the accompanying drawing.

During normal operation, the bearing used in the torque releasing device inhibits relative motion between races (inner and outer rings) and balls so that the races and balls move in unison with the shaft member and the cylinder member. When the torque is released at the occurrence of an abnormal torque, the bearing is brought into quick operation such as to permit the shaft member and the cylinder member to rotate relative to each other.

Where the bearing is the deep-groove ball bearing, however, fretting occurs between the balls and raceway surfaces each of the races during the normal operation (in a state where the races and the balls do not perform the relative motion). The inventors have found the following fact. Where the bearing sustaining the fretting is brought into quick operation (the bearing I non-rotation state is brought into high-speed rotation (say a number of rotation of thousands), the bearing will suffer failure such as smearing, which will result in incapability of securely releasing the torque.

SUMMARY OF THE INVENTION

It is, therefore, an object of the present invention to provide a torque releasing device which is designed to prevent occurrence of fretting at a bearing during torque transmission, thereby ensuring secure torque releasing.

A torque releasing device according to the present invention comprises a first member in the form of a shaft; and a cylindrical second member disposed on an outer circumferential face of the first member. The second member is frictionally engageable with the first member to permit torque transmission between the first member and the second member. In the event of an abnormal torque, the first member and the second member are released from the frictional engagement so as to disable the torque transmission.

The torque releasing device further comprises a bearing for permitting both of the members to rotate relative to each other when these members are released from the frictional engagement. The bearing comprises an angular contact ball bearing, raceway surfaces of which are applied with a pre-load. This prevents the occurrence of fretting at the bearing during normal operation. Therefore, the bearing is prevented from sustaining smearing even though the bearing is brought into quick operation when the torque is released. Thus is ensured that the torque is securely released.

It is preferred that the angular contact ball bearing is mounted to the first member or the second member via a spacer for applying the pre-load to the raceway surfaces of the angular contact ball bearing. In this case, the required pre-load can be applied to the angular contact ball bearing by means of the spacer.

It is further preferred that the spacer is interposed between the first member and an inner ring of the angular contact ball bearing.

It is still further preferred that the first member or the second member includes a hydraulic oil path which is operated by a pressure oil supplied thereto to produce a pressurizing force between the second member and the first member thereby bringing the first and second members into frictional engagement, the hydraulic oil path from which the pressure oil is discharged in the event of the abnormal torque, thus releasing the members from the frictional engagement.

BRIEF DESCRIPTION OF THE DRAWING

FIG. 1 is a sectional view showing a torque releasing device.

DESCRIPTION OF THE PREFERRED EMBODIMENT

A preferred embodiment of the present invention will hereinbelow be described with reference to the accompanying drawing. FIG. 1 shows a torque releasing device 1 according to an embodiment of the present invention. The torque releasing device 1 is used in a power transmission system for a rolling mill and is disposed between a reduction roll (not shown) and a motor (not shown) for driving the reduction roll.

The torque releasing device 1 transmits torque from the motor to the reduction roll during normal operation. However, in the event of trouble on a reduction roll side, such as locking or abnormal torque (excessive torque), the device releases the torque so as to disable the transmission of the torque from the motor to the reduction roll and hence, the motor idles.

The torque releasing device 1 includes a first member 11 connected to the motor; and a second member 12 connected to the reduction roll via an unillustrated universal joint. The first member 11 is fitted inside of the second member 12.

The first member 11 is constructed in the form of a shaft, including a primary shaft portion 14; and an outside shaft portion 15 fitted on the primary shaft portion 14 such as to rotate unitarily therewith. The first member 11 is driven into rotation by the rotating motor. The outside shaft portion 15 includes a greater diameter portion 16 on one axial side thereof; and a smaller diameter portion 17 having a smaller diameter than that of the greater diameter portion 16. The smaller diameter portion 17 has a smaller diameter than that of the primary shaft portion 14. It is noted here that the outside shaft portion 15 does not necessarily have the smaller diameter portion 17. The smaller diameter portion 17 may have the same diameter as the greater diameter portion 16.

The second member 12 has a cylindrical shape and is fitted on an outer circumferential face of the first member 11 (the outside shaft portion 15 thereof) via rolling bearings 20, 21. Thus, the rolling bearings 20, 21 permit the first member 11 and the second member 12 to rotate relative to each other. The second member 12 includes a joint cylinder member 23; and an outside cylinder portion 24. The joint cylinder member 23 is arranged such that an inner circumferential face thereof is adapted to contact the outer circumferential face of the first member 11 the outside shaft portion 15 thereof. The outside cylinder portion 24 is fitted on the joint cylinder member 23 so as to rotate unitarily therewith. A coupling member 25 is coaxially attached to the joint cylinder member 23 in a manner to rotate unitarily therewith. The coupling member 25 is connected to the reduction roll via an unillustrated universal joint.

A hydraulic oil path 26 is formed at the outside cylinder portion 24 (on the inner circumferential face thereof). The hydraulic oil path 26 is an axially elongated slit which has an annular axial section. The hydraulic oil path 26 is adapted to be supplied with pressure oil from an unillustrated supply port. In a state where the hydraulic oil path 26 is filled with the pressure oil, the pressure oil reduces the diameter of the joint cylinder member 23, so that the joint cylinder member 23 is pressed against the outer circumferential face of the first member 11. As a consequence, the first member 11 and the second member 12 are brought into frictional engagement which permits the torque to be transmitted from the motor to the reduction roll. That is, the first member 11 and the second member 12 are brought into unitary rotation.

The aforementioned bearings 20, 21 are disposed on axially opposite sides externally of a range where the outer circumferential face of the outside shaft portion 15 (the first member 11) is in frictional engagement with the inner circumferential face of the joint cylinder member 23 (the second member 12) or in other words, a range where the hydraulic oil path 26 is extended. These rolling bearings 20, 21 are constructed as an angular contact ball bearing.

The angular contact ball bearing 20 (first angular contact ball bearing) disposed on the left-hand side as seen in FIG. 1 (on a motor side) has an inner ring 20a thereof mounted to the greater diameter portion 16 of the outside shaft portion 15 (the first member 11), whereas an outer ring 20b thereof is mounted to the outside cylinder portion 24 (the second member 12). The outer ring 20b of the first angular contact ball bearing 20 is fixedly positioned with axially both end faces thereof axially clamped between the outside cylinder portion 24 and a bearing positioning member 28. On the other hand, the inner ring 20a of the first angular contact ball bearing 20 is applied with a pre-load directed toward the other angular contact ball bearing 21 by means of a ring-like spacer 30 disposed at the end face thereof opposite from the other angular contact ball bearing 21.

In the other angular contact ball bearing 21 (second angular contact ball bearing) disposed on the right-hand side as seen in FIG. 1, an inner ring 21a thereof is mounted to the smaller diameter portion 17 of the outside shaft portion 15 (the first member 11) whereas an outer ring 21b thereof is mounted to the joint cylinder member 23 (the second member 12). The outer ring 21b of the second angular contact ball bearing 21 is fixedly positioned with axially both end faces thereof axially clamped between the joint cylinder portion 23 and a bearing positioning member 32. On the other hand, the inner ring 21a of the second angular contact ball bearing 21 is applied with a pre-load directed toward the first angular contact ball bearing 20 by means of a ring-like spacer 34 disposed at the end face thereof opposite from the first angular contact ball bearing 20. The spacer 30, 34 are each prepared as follows. Measurement is previously taken on an amount of pressurization based on which the spacer applies the pre-load to the angular contact ball bearing 20, 21. The spacer 30, 34 are formed so as to apply the predetermined pre-load corresponding to the amount of pressurization to the angular contact ball bearing 20, 21. Since the torque releasing device 1 employs the angular contact ball bearings 20, 21, the device has an increased load capacity with respect to thrust load.

In the state of normal torque transmission wherein the first member 11 and the second member 12 are rotated in unison, the angular contact ball bearings 20, 21 are also in non-operative state wherein the inner and outer rings and the balls do not perform the relative motion. Even in the non-operative state, the device is constructed such that the raceway surfaces of the bearings are prevented from sustaining the fretting by the pre-load.

When the second member 12 is subjected to an abnormal load above the predetermined value as a result of the occurrence of seizure or the like on the reduction roll side, the inner circumferential face of the second member 12 (the joint cylinder member 23 thereof) slips relative to the outer circumferential face of the first member 11 (the outside shaft portion 15 thereof). An arrangement is made such that the slippage causes the pressure oil in the hydraulic oil path 26 to be discharged therefrom. Thus, the inner circumferential face of the second member 12 is no more pressed against the outer circumferential face of the first member 11 and hence, the first member 11 and the second member 12 are released from the engagement so as to be disabled to transmit the torque. Specifically, the second member 12 on the reduction roll side is brought to rest while the first member 11 on the motor side is rotated at high speed.

The angular contact ball bearings 20, 21 in the non-operative state are instantaneously brought into high-speed rotation or into the quick operation at the same time that the torque is released. However, the embodiment applies the pre-load to obviate the fretting on the raceway surfaces, so that the bearings 20, 21 may be prevented from sustaining the smearing or the like.

What is claimed is:
1. A torque releasing device comprising:
a first member in the form of a shaft;
a second member disposed on an outer circumferential face of the first member and frictionally engageable with the first member to permit torque transmission from the first member but designed to be released from the frictional engagement with the first member in the event of an abnormal torque thereby to inhibit the torque transmission; and
the second member comprising an outside cylinder portion including a hydraulic oil path which is operated by a pressure oil supplied thereto to produce a pressurizing force for bringing the first member and the second member into the frictional engagement; and a joint cylinder member formed in a thickness to permit the pressure oil in the hydraulic oil path to reduce the diameter thereof, and possessing an inner circumferential face on which the joint cylinder member reduced in the diameter frictionally engages an outer circumfer- ential face of the first member, the outside cylinder portion fitted on the joint cylinder member for unitary rotation with the joint cylinder member;

a first bearing disposed at one of the opposite axial-outside regions with respect to the hydraulic oil path in order to permit both of the members to rotate relative to each other when the members are released from the frictional engagement; and a second bearing disposed at the other of the opposite axial-outside regions with respect to the hydraulic oil path in order to permit both of the members to rotate relative to each other when the members are released from the frictional engagement, the second bearing comprises an angular contact ball bearing which includes an outer ring and an inner ring, raceway surfaces of which are applied with a pre-load, and which has its outer ring mounted to the joint cylinder member and its inner ring mounted to the first member, and wherein the joint cylinder member includes a segment of substantially the same thickness as that of its segment extended in correspondence to the hydraulic oil path, the former segment defined between the extent of the hydraulic oil path and the region where the second bearing is disposed.

2. A torque releasing device as claimed in claim 1, wherein the second bearing comprising the angular contact ball bearing is mounted to the first member or second member via a spacer for applying the pre-load to the raceway surfaces of the angular contact ball bearing.

3. A torque releasing device as claimed in claim 2, wherein the spacer is interposed between the first member and the inner ring of the second bearing comprising the angular contact ball bearing.

4. A torque releasing device as claimed in claim 1, the hydraulic oil path from which the pressure oil is discharged in the event of the abnormal torque, thus releasing the members from the frictional engagement.

5. A torque releasing device as claimed in claim 1, wherein the first bearing comprises an angular contact ball bearing which includes an outer ring and an inner ring, and raceway surfaces of which are applied with the pre-load.

6. A torque releasing device as claimed in claim 5, wherein the first bearing has its outer ring mounted to the outside cylinder portion and its inner ring mounted to the first member.

7. A torque releasing device as claimed in claim 5, wherein the first bearing comprising the angular contact ball bearing is mounted to the first member or the second member via a spacer for applying the pre-load to the raceway surfaces of the angular contact ball bearing.

8. A torque releasing device as claimed in claim 7, wherein the spacer is interposed between the first member and the inner ring of the first bearing comprising the angular contact ball bearing.

9. A torque releasing device comprising:

a first member in the form of a shaft;

a second member disposed on an outer circumferential face of the first member and frictionally engageable with the first member to permit torque transmission from the first member but designed to be released from the frictional engagement with the first member in the event of an abnormal torque thereby to inhibit the torque transmission; and the second member comprising an outside cylinder portion including a hydraulic oil path which is operated by a pressure oil supplied thereto to produce a pressurizing force for bringing the first member and the second member into the frictional engagement; and a joint cylinder member formed in a thickness to permit the pressure oil in the hydraulic oil path to reduce the diameter thereof, and possessing an inner circumferential face on which the joint cylinder member reduced in the diameter frictionally engages an outer circumferential face of the first member, the outside cylinder portion fitted on the joint cylinder member for unitary rotation with the joint cylinder member;

a first bearing disposed at one of the opposite axial-outside regions with respect to the hydraulic oil path in order to permit both of the members to rotate relative to each other when the members are released from the frictional engagement; and a second bearing disposed at the other of the opposite axial-outside regions with respect to the hydraulic oil path in order to permit both of the members to rotate relative to each other when the members are released from the frictional engagement, the second bearing including an outer ring and an inner ring, the outer ring mounted to the joint cylinder member, the inner ring mounted to the first member, wherein the joint cylinder member includes a segment of substantially the same thickness as that of its segment extended in correspondence to the hydraulic oil path, the former segment defined between the extent of the hydraulic oil path and the region where the second bearing is disposed.

10. A torque releasing device as claimed in claim 9, the hydraulic oil path from which the pressure oil is discharged in the event of the abnormal torque, thus releasing the members from the frictional engagement.

11. A torque releasing device comprising:

a first member in the form of a shaft;

a second member disposed on an outer circumferential face of the first member and frictionally engageable with the first member to permit torque transmission from the first member but designed to be released from the frictional engagement with the first member in the event of an abnormal torque thereby to inhibit the torque transmission; and the second member comprising an outside cylinder portion including a hydraulic oil path which is operated by a pressure oil supplied thereto to produce a pressurizing force for bringing the first member and the second member into the frictional engagement; and a joint cylinder member formed in a thickness to permit the pressure oil in the hydraulic oil path to reduce the diameter thereof, and possessing an inner circumferential face on which the joint cylinder member reduced in the diameter frictionally engages an outer circumferential face of the first member, the outside cylinder portion fitted on the joint cylinder member for unitary rotation with the joint cylinder member;

a first bearing disposed at one of the opposite axial-outside regions with respect to the hydraulic oil path in order to permit both of the members to rotate relative to each other when the members are released from the frictional engagement; and a second bearing disposed at the other of the opposite axial-outside regions with respect to the hydraulic oil path in order to permit both of the members to rotate relative to each other when the members are released from the frictional engagement, the second bearing including an outer ring and an inner ring, the outer ring mounted to the joint cylinder member, the inner ring mounted to the first member, wherein the joint cylinder member includes a segment of substantially the same thickness as that of its segment extended in correspondence to the hydraulic oil path, the former segment defined between the extent of the hydraulic oil path and the region where the second bearing is disposed, and wherein an outside diameter of the outer ring of the second bearing is smaller than an inside diameter of the segment of the joint cylinder member.

12. A torque releasing device as claimed in claim 11, wherein the second bearing comprises an angular contact ball bearing, raceway surfaces of which are applied with a pre-load.

13. A torque releasing device as claimed in claim 12, wherein the second bearing comprising the angular contact ball bearing is mounted to the first member or the second member via a spacer for applying the pre-load to the raceway surfaces of the angular contact ball bearing.

14. A torque releasing device as claimed in claim 13, wherein the spacer is interposed between the first member and the inner ring of the second bearing comprising the angular contact ball bearing.

15. A torque releasing device as claimed in claim 11, wherein the first bearing has its outer ring mounted to the outside cylinder portion and its inner ring mounted to the first member.

16. A torque releasing device as claimed in claim 15, wherein the first bearing comprises an angular contact ball bearing, raceway surfaces of which are applied with a pre-load.

17. A torque releasing device as claimed in claim 16, wherein the first bearing comprising the angular contact ball bearing is mounted to the first member or the second member via a spacer for applying the pre-load to the raceway surfaces of the angular contact ball bearing.

18. A torque releasing device as claimed in claim 17, wherein the spacer is interposed between the first member and the inner ring of the first bearing comprising the angular contact ball bearing.

19. A torque releasing device as claimed in claim 11, the hydraulic oil path from which the pressure oil is discharged in the event of the abnormal torque, thus releasing the members from the frictional engagement.

20. A torque releasing device comprising:
a first member in the form of a shaft;
a second member disposed on an outer circumferential face of the first member and frictionally engageable with the first member to permit torque transmission from the first member but designed to be released from the frictional engagement with the first member in the event of an abnormal torque thereby to inhibit the torque transmission; and
the second member comprising an outside cylinder portion including a hydraulic oil path which is operated by a pressure oil supplied thereto to produce a pressurizing force for bringing the first member and the second member into the frictional engagement; and a joint cylinder member formed in a thickness to permit the pressure oil in the hydraulic oil path to reduce the diameter thereof, and possessing an inner circumferential face on which the joint cylinder member reduced in the diameter frictionally engages an outer circumferential face of the first member, the outside cylinder portion fitted on the joint cylinder member for unitary rotation with the joint cylinder member;
a first bearing disposed at one of the opposite axial-outside regions with respect to the hydraulic oil path in order to permit both of the members to rotate relative to each other when the members are released from the frictional engagement; and
a second bearing disposed at the other of the opposite axial-outside regions with respect to the hydraulic oil path in order to permit both of the members to rotate relative to each other when the members are released from the frictional engagement,
the second bearing comprising an angular contact ball bearing which includes an outer ring and an inner ring, raceway surfaces of which are applied with a pre-load, and which has its outer ring mounted to the joint cylinder member and its inner ring mounted to the first member,
wherein the joint cylinder member includes a segment of substantially the same thickness as that of its segment extended in correspondence to the hydraulic oil path, the former segment defined between the extent of the hydraulic oil path and the region where the second bearing is disposed,
wherein an outside diameter of the outer ring of the second bearing is smaller than an inside diameter of the segment of the joint cylinder member, and
wherein the hydraulic oil path from which the pressure oil is discharged in the event of the abnormal torque, thus releasing the members from the frictional engagement.

* * * * *